Dec. 24, 1935.   J. C. FORD   2,025,029
MEANS FOR MOLDING ARTICLES
Filed Aug. 17, 1933   2 Sheets-Sheet 2
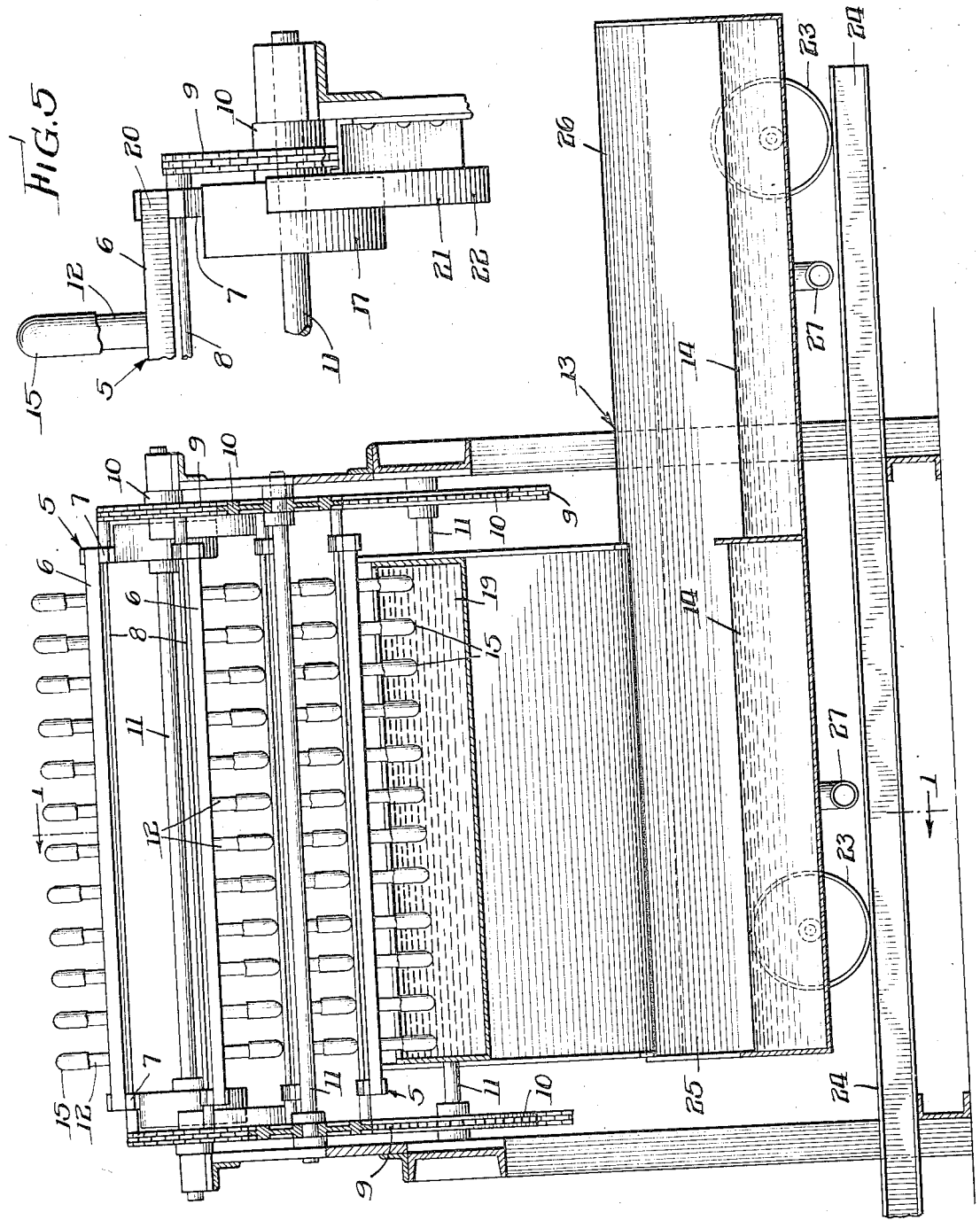
Inventor:
Joseph C. Ford
By Cox & Moore attys.

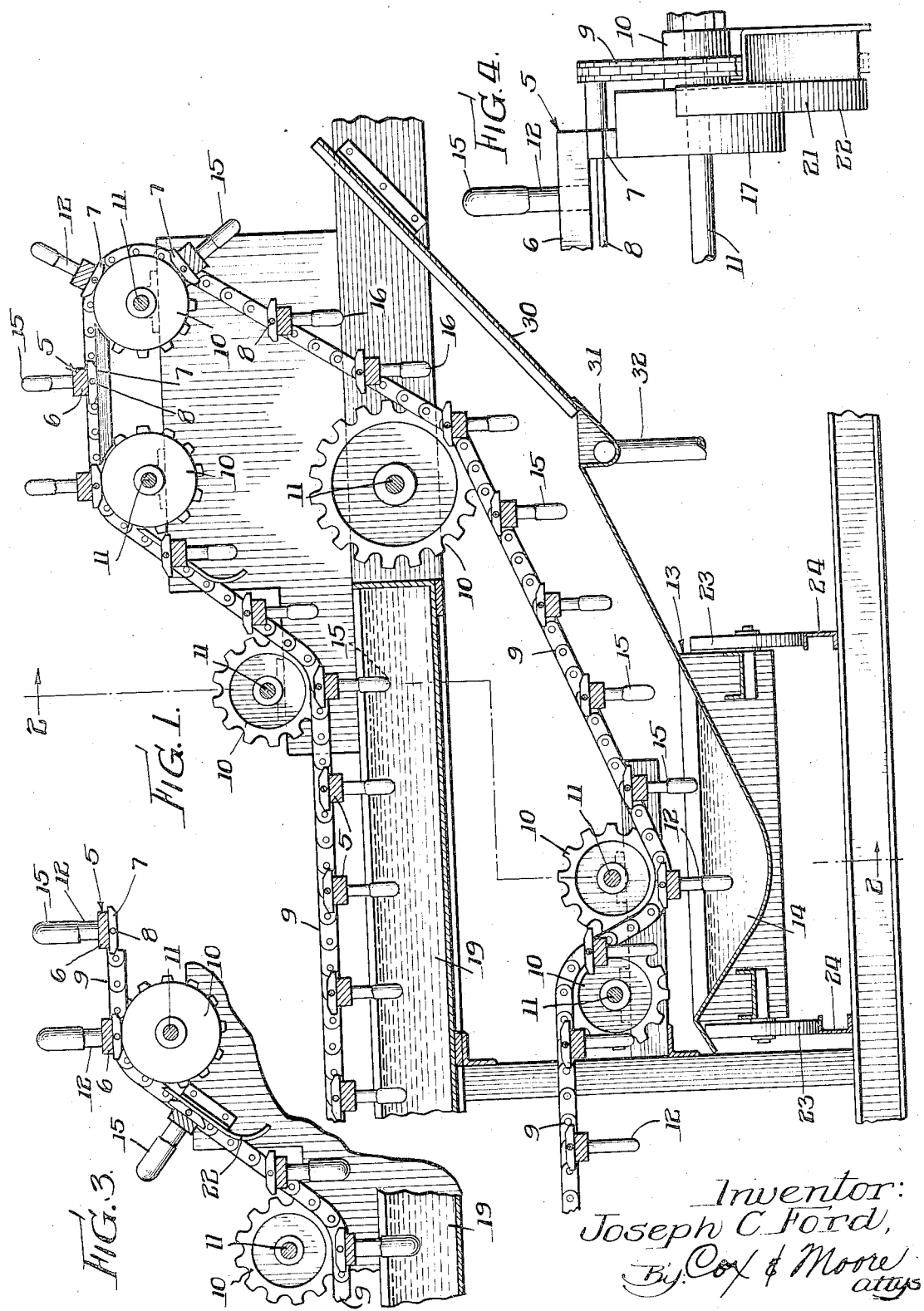

Patented Dec. 24, 1935

2,025,029

UNITED STATES PATENT OFFICE 2,025,029

MEANS FOR MOLDING ARTICLES

Joseph C. Ford, Madison, Wis., assignor to The Celon Company, Madison, Wis., a corporation of Wisconsin Application August 17, 1933, Serial No. 685,579

10 Claims. (Cl. 18—25)

This invention relates to means for molding articles and particularly to an apparatus for making sealing elements from regenerated substance, such as viscose or gelatin.

The primary object of the invention is to provide a new and improved apparatus for carrying molds to a particular position relative to a supply of the substance used to provide a coating about the exterior surface of the molds.

Another object is to provide an apparatus for moving or positioning the molds so that the film of material thereon will be caused to flow about the mold in a predetermined manner.

A further object of the invention is to provide means for selectively dipping the molds and then selectively moving the molds along a predetermined path to obtain the desired flow of the material about the molds.

A still further object is to provide a continuous operating device carrying molds to bring the molds into filming relationship with a substance bath to film the molds whereby molds of various sizes may be selectively dipped or immersed in different baths according to a predetermined arrangement.

Numerous other objects and advantages will be apparent throughout the progress of the following specification.

The accompanying drawings illustrate a selected embodiment of the invention and the views therein are as follows:

Fig. 1 is a detail sectional view of the improved apparatus and showing the method, of dipping the molds in a substance bath, the view being taken on the line 1—1 of Fig. 2.

Fig. 2 is a detail sectional view on the line 2—2 of Fig. 1.

Fig. 3 is a detail sectional view showing the movement and position of the larger size molds.

Fig. 4 is a detail sectional view showing means for varying the angular position of the molds relative to the chain.

Fig. 5 is a view similar to Fig. 4 showing guide means for determining the position of the larger size molds.

The particular apparatus herein shown, for the purpose of illustration, comprises a plurality of longitudinal mold carrying supports 5 which include a longitudinal bar 6 and shoes 7 fastened to each end of the bar 6. Each support 5 carries a shaft 8 which has operable engagement with endless chains 9 whereby the supports are free to pivot on the axis 8 and are translated by the chains 9. The chains are driven by suitable mechanism and ride over sprockets 10 supported on shafts 11 to move the supports continuously along a circuitous path. A plurality of horizontally spaced preferably removable molds 12 are carried by each support, and the supports being pivotally mounted relative to the chains 9, normally hang downwardly from the chains as shown. The molds on the supports are successively fed by the chains 9 to a movable hopper 13 carrying a predetermined amount of substance 14. If the molds 12 move to feeding position to be immersed in the substance 14, they extend vertically downward and are immersed in the substance 14 to provide a film 15 of the substance on the molds. After the molds leave the substance and have their exterior surfaces provided with a film of the substance, they are permitted to remain in their downwardly extending position to permit the substance to flow toward the end 16 of the molds to cause sufficient material to flow to the ends of the molds. After the molds leave the substance, they are permitted to remain in their downwardly extending position to permit a certain amount of the substance to drip off the mold. When they have dripped a predetermined length of time, they are inverted and are caused to move from a downward position to an upright vertical position by shifting the mold supports on their axes 8 causing them to move from downward position to vertical position and then returning to normal downward position. The molds remain in their vertical position until the heavy drop of substance on the end, caused by the dripping, has spread out over the end. The movement of the molds is accomplished by applying or fastening a drum 17 to each end of the two uppermost shafts 11 and arranging a guide member 18 between the uppermost sprockets 10 as shown in Figs. 1 and 4. Thus, while the molds move along the continuous path, the end shoes 7 on each support 5 will engage the drums 17 and the guides 18 and will be moved from normal downwardly extending position, through various angles, to upright vertical position and then back again to downward position. The movement of the molds from first, down position through the various angles to horizontal, upright, horizontal and downward positions causes the film 15 of the substance to become equally distributed and, therefore, causes an even thickness of the substance about the mold. The big molds are allowed to assume somewhat of a horizontal position to permit the stream of substance which has fallen on the side of the mold during the process of inverting, to spread out over the side. They then assume a normal downward position to permit the end of the mold to become a little heavier laden with the substance. Each set of molds, having the film 15 properly spread thereon, is then moved to coagulating or regenerating position. If the substance 14 is viscose, the molds pass through successive baths 19 to coagulate and regenerate the viscose into hydrated cellulose. The treating of the film in the various baths to provide the hydrated cellulose is well known in the art and will not be described herein. If, however, the substance 14 is jelly, gelatin or any of the derivatives or equivalents thereof, the molds will pass through a temperature curing chamber or compartment, not shown. The manner of treating jelly is also well known in this art and no further reference thereof shall be made.

It is often desirable to make various sizes of caps without changing the molds or their supports, but from a practical standpoint it is desirable and practically necessary that smaller molds return to downward position quicker than the larger molds to provide efficient caps of the smaller size. Also, it is preferable that the larger molds be prevented from attaining the downward position too rapidly so that the substance may be evenly spread circumferentially about the tubular film. In other words, in the making of small caps, it is necessary that the smaller molds be maintained longer in the downward position after being coated with the substance and prior to regeneration, while in the making of larger caps it is necessary that the larger molds be maintained out of normal downward position for a longer period of time to insure more equal distribution of the substance about the molds on account of having a larger surface coat of the substance. Therefore, when small molds and large molds are used at the same time, the smaller molds should be returned to downward position earlier, and the larger molds should be prevented from attaining the downward position too rapidly. To accomplish this result the supports 5 carrying the larger molds are provided with extensions 20 on their ends, Fig. 5, so that the shoes 7 will come in contact with a cam or guide surface 21. Thus, during operation of the chains, the longer bars will contact with the drums 17, the guide members 18 and the surface guides 21, Figs. 3 and 5, and prevent the supports 5 from pivoting on their axes until they reach the end 22 of the guides or cam surfaces 21.

The supports 5 for the smaller molds do not have the extensions 20, Fig. 4. Therefore, as soon as the shoes leave the last drum 17, the supports will pivot on their axes and immediately return to downward position, Fig. 1. The supports 5 for the smaller molds are sufficiently long so that the shoes 7 will engage the drums 17, but are short enough to keep the shoes 7 from coming into engagement with the members 21.

The supply hopper 13 is made movable and is provided with wheels 23 which run on tracks 24. The hopper also has two compartments 25 and 26 each carrying a supply of substance 14. The liquid level of the substance in each compartment is made variable as it is desirable that the smaller tubes do not extend too deeply into the material. It is also necessary, however, that the larger tubes extend down into the material a sufficient amount. Therefore, as the molds are being fed to dipping position, the hopper 13 may be moved inwardly and outwardly to cause any desired number of molds to be filmed selectively in either compartment. Also, it might be desirable to use a different kind of substance. In the compartment 25 the substance may contain a pigment to make an opaque cap, while in the compartment 26 the ordinary substance without a pigment may be used to provide transparent caps. It is advantageous, however, to have different liquid levels so that the compartment 25 may be in position for coating the larger molds, while the compartment 26 may be used for coating the smaller molds. As the hopper is made movable, it is an easy matter to shift the hopper to bring the proper compartment into position relative to the proper molds. The double compartment feature of the hopper and its movability insures the making of different sized caps according to a predetermined or selected arrangement.

The tank or container 13 may be provided with pipe connections 27, Fig. 2, to drain the contents of each compartment.

A shield 30, Fig. 2, may extend upwardly from an end of the hopper or tank 13 to catch any drip which may fall from the coated tubes and deposit it in a gutter 31 whereby the drip will then flow out of a pipe 32.

The invention provides novel means for continuously making articles of various sizes, and permits molds of smaller sizes to be operated continuously along with molds of larger sizes. Furthermore, the invention provides means whereby separate tanks of substance may be used selectively in accordance with the type of molds to be coated.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In a device of the character described comprising a plurality of mold carrying members, means for moving the members along a predetermined path, means for moving the members through various angles, means for stopping movement through said various angles at any desirable predetermined point, and means for holding some of the members in a predetermined angular position longer than other of said members.

2. In a device of the character described comprising a plurality of mold carrying members, means for moving the members along a predetermined path and through various angles, means for stopping movement through said various angles at any desirable predetermined point, and means for selectively maintaining some of the members at a predetermined angular position longer than other of said molds, said means cooperating with mold carrying members different from other mold carrying members so as to allow the latter to be positioned for a relatively longer or shorter period of time at any predetermined or desirable angle.

3. In a device of the character described comprising a plurality of mold carrying members, means for moving the members along a predetermined path, means for moving the members through various angles, means for stopping movement through said various angles at any desirable predetermined point, means for holding some of the members in a predetermined angular position longer than other of said members, and means for supplying a coating of substance to the molds.

4. In a device for making regenerated articles from a substance comprising a plurality of molds, a movable tank containing substance and adapted to be shifted into position relative to certain molds, means to pass certain molds through the tank to provide a coating of the substance on the molds, means to move the coated molds through various angular positions, and means for selectively moving the molds along divergent paths.

5. In a device for making regenerated articles from a substance, comprising a plurality of molds, a movable tank containing substance and adapted to be shifted into position relative to certain molds, means to pass certain molds through the tank to provide a coating of the substance on the molds, means to move the coated molds through various angular positions, means for stopping movement through said various angular positions at any desirable predetermined point, and means for maintaining the angular position of some of the molds for a longer period of time than other molds.

6. In a device for making regenerated articles from a substance, comprising a plurality of molds, a movable tank containing substance and adapted to be shifted into position relative to certain molds, means to pass certain molds through the tank to supply a coating of the substance on the molds, means for moving the coated molds through various angles, means for stopping movement through said various angles at any desirable predetermined point, and means for maintaining some of the molds in a predetermined angular position for a longer period of time than other of said molds.

7. A device for coating molds comprising moving endless chains, bars pivotally connected to said chains and translated thereby, molds carried by the bars, substance carrying tanks in juxtaposition relative to the molds whereby the molds will be dipped in the substance in the tanks during translation by the chains, said tanks being shiftable whereby certain of said molds may be dipped in the substance in a predetermined tank, said molds normally being carried in a downwardly extending vertical position, shoes on said bars, drums engageable with the shoes for rotating the bars so as to move the molds out of the normal vertical position relative to the chains when the bars reach a predetermined position, and means engageable with the shoes on said mold carrying bars, said means engaging said shoes when the bars reach a predetermined position, thereby preventing the bars from assuming their former angle and thereby maintaining the last assumed position of said bars over a certain predetermined course of their travel.

8. A device for coating molds comprising moving endless chains, bars pivotally connected to said chains and translated thereby, molds carried by the bars, substance carrying tanks in juxtaposition relative to the molds whereby the molds will be dipped into the substance in the tanks during translation by the chains, said tanks being shiftable whereby certain of said molds may be dipped in the substance in a predetermined tank, said molds normally being carried in a downwardly extending vertical position, shoes on said bars, drums engageable with the shoes for rotating the bars so as to move the molds out of the normal vertical position relative to the chains when the bars reach a predetermined position, means engageable with the shoes on said mold carrying bars, said means engaging said shoes when the bars reach a predetermined position, thereby preventing the bars from assuming their former angle and thereby maintaining the last assumed position of said bars over a certain predetermined course of their travel, and means for causing all the bars to resume the same position relative to the chains when the chains move the bars to a predetermined position.

9. A device for coating molds comprising moving endless chains, bars pivotally connected to said chains and translated thereby, molds carried by the bars, sprockets supporting said chains, said sprockets being arranged to cause the chains to move through an irregular path, substance carrying tanks arranged beneath the chains at points in their path where the path dips downwardly, said tanks having return flow aprons thereon, shoes on said bars, said shoes being arranged at the normal top of the bars when said bars are held freely and the molds are correspondingly in a downwardly extending vertical position, drums engageable with said shoes, whereby the molds are moved out of their normal downwardly extending vertical position when the path of the chains is being doubled back on itself, means arranged on one side of said drums to engage the shoes as they leave the drums and thereby maintain the molds in the position at which they leave the drums, and slide means engaging said shoes as they leave said last named means, said slide means being adapted to permit the molds to finally assume a downwardly extending vertical position.

10. A device for coating molds comprising moving endless chains, bars pivotally connected to said chains and translated thereby, molds carried by the bars, sprockets supporting said chains, said sprockets being arranged to cause the chains to move through an irregular path, substance carrying tanks arranged beneath the chains at points in their path where the path dips downwardly, said tanks having return flow aprons thereon, shoes on said bars, said shoes being arranged at the normal top of the bars when said bars are held freely and the molds are correspondingly in a downwardly extending vertical position, a drum engageable with said shoes, whereby the molds are moved out of their normal downwardly extending vertical position when the path of the chains is being doubled back on itself, means arranged on one side of said drum to engage the shoes as they leave the drum and thereby maintain the molds in the position at which they leave the drum, slide means engaging said shoes as they leave said last named means, another drum engaging said shoes for rotating said mold carrying bars out of the last named position, and slide means adjacent to the last named drum for allowing the molds to gradually rotate and assume their former downwardly extending vertical position.

JOSEPH C. FORD.